United States Patent
Jain et al.

(10) Patent No.: US 10,282,641 B2
(45) Date of Patent: May 7, 2019

(54) TECHNOLOGIES FOR CLASSIFICATION USING SPARSE CODING IN REAL TIME

(71) Applicant: Intel Corporation, Santa Clara, CA (US)

(72) Inventors: Nilesh K. Jain, Beaverton, OR (US); Soonam Lee, West Lafayette, IN (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 15/200,069

(22) Filed: Jul. 1, 2016

(65) Prior Publication Data
US 2018/0005086 A1    Jan. 4, 2018

(51) Int. Cl.
G06K 9/46    (2006.01)
G06K 9/48    (2006.01)
G06K 9/62    (2006.01)

(52) U.S. Cl.
CPC ........... *G06K 9/6269* (2013.01); *G06K 9/481* (2013.01); *G06K 9/6249* (2013.01); *G06K 9/6255* (2013.01); *G06K 9/6256* (2013.01); *G06K 2009/4695* (2013.01)

(58) Field of Classification Search
None
See application file for complete search history.

(56) References Cited

U.S. PATENT DOCUMENTS

| 2009/0228412 A1* | 9/2009 | Matsumoto ........ G06K 9/00765 706/12 |
| 2010/0083208 A1 | 4/2010 | Lai et al. |
| 2011/0116711 A1 | 5/2011 | Wang et al. |
| 2015/0006443 A1 | 1/2015 | Rose et al. |
| 2015/0186458 A1* | 7/2015 | Gupta ............... G06F 17/30424 707/769 |

OTHER PUBLICATIONS

Zubair, Syed, Fei Yan, and Wenwu Wang. "Dictionary learning based sparse coefficients for audio classification with max and average pooling." Digital Signal Processing 23.3 (2013): 960-970.*

(Continued)

*Primary Examiner* — Manav Seth
*Assistant Examiner* — David Perlman
(74) *Attorney, Agent, or Firm* — Barnes & Thornburg LLP

(57) ABSTRACT

Technologies for classification using sparse coding are disclosed. A compute device may include a pattern-matching accelerator, which may be able to determine the distance between an input vector (such as an image) and several basis vectors of an overcomplete dictionary stored in the pattern-matching accelerator. The pattern matching accelerator may be able to determine each of the distances simultaneously and in a fixed amount of time (i.e., with no dependence on the number of basis vectors to which the input vector is being compared). The pattern-matching accelerator may be used to determine a set of sparse coding coefficients corresponding to a subset of the overcomplete basis vectors. The sparse coding coefficients can then be used to classify the input vector.

25 Claims, 7 Drawing Sheets

(56) References Cited

OTHER PUBLICATIONS

Aharon, Michal, Michael Elad, and Alfred Bruckstein. "rm K-SVD: An algorithm for designing overcomplete dictionaries for sparse representation." IEEE Transactions on signal processing 54.11 (2006): 4311-4322.*

"Sparse Coding," Unsupervised Feature Learning and Deep Learning Wiki, http://ufldl.stanford.ed/wiki/index.php/Main_Page, retrieved May 25, 2016, 4 pages.

"Matching Pursuit," Wikipedia, The Free Encyclopedia, http://en.wikipedia.org/wiki/Matching_Pursuit, retrieved May 25, 2016, 4 pages.

Abedin, M.A. et al., "Fully-Parallel Associative Memory Architecture Realizing Minimum Euclidean Distance Search," Sep. 16, 2005, 4th Hiroshima International Workshop on Nanoelectronics for Tera-Bit Information Processing, 3 pages.

L. Bo, X. Ren, and D. Fox, "Hierarchical Matching Pursuit for Image Classification: Architecture and Fast Algorithms," Advances in Neural Information Processing Systems (NIPS) 24, pp. 2115-2123, 2011, 9 pages.

L. Bo, X. Ren, and D. Fox, "Multipath Sparse Coding Using Hierarchical Matching Pursuit," Proceedings of the IEEE Conference on Computer Vision and Pattern Recognition (CVPR), pp. 660-667, 2013, 8 pages.

Q. V. Le, J. Ngiam, A. Coates, A. Lahiri, B. Prochnow, and A. Y. Ng, "On optimization methods for deep learning," Proceedings of the 28th Annual International Conference on Machine Learning (ICML), pp. 265-272, 2011,Bellevue, WA, 8 pages.

B. A. Olshausen and D. J. Field, "Emergence of Simple-Cell Receptive Field Properties by Learning a Sparse Code for Natural Images," Nature, vol. 381, pp. 607-609, Jun. 1996, 3 pages.

R. Raina, A. Madhavan, and A. Y. Ng, "Large-scale Deep Unsupervised Learning Using Graphics Processors," Proceedings of the 26th Annual International Conference on Machine Learning (ICML), pp. 873-880, 2009, Montreal, Canada, 8 pages.

R. Rubinstein, M. Zibulevsky, and M. Elad, "Efficient Implementation of the K-SVD Algorithm using Batch Orthogonal Matching Pursuit," Technical report, 2008, 15 pages.

INTEL QUARK SE Microcontroller, Product Brief, dated Nov. 2015, 3 pages.

INTEL QUARK SE Microcontroller, User Guide, dated Oct. 2015, 43 pages.

International search report for PCT application No. PCT/US2017/035462, dated Sep. 8, 2017 (3 pages).

Written opinion for PCT application No. PCT/US2017/035462, dated Sep. 8, 2017 (3 pages).

M. W. Spratling, 'Classification using sparse representations: a biologically plausible approach', Biological cybernetics, vol. 108, Issue 1, Feb. 2014, pp. 61-73. <URL: https://nms.kcl.ac.uk/michael.spratling/Doc/sparse_classification.pdf>. See pp. 63-68.

Yan He et al., 'Sparse Representation Over Overcomplete Dictionary Based on Bayesian Nonparametric Approximation', International Journal of Computer and Electrical Engineering, vol. 4, No. 4, Aug. 2012, pp. 546-549. <URL: http://www.ijcee.org/papers/554-P226.pdf>. See pp. 546-548.

* cited by examiner

TECHNOLOGIES FOR CLASSIFICATION USING SPARSE CODING IN REAL TIME

BACKGROUND

Representing images with simple and robust features is a crucial step in image processing, computer vision, and machine learning. Traditional feature extraction approaches such as scale-invariant feature transform (SIFT) are time-consuming, expensive, and domain specific.

Applying deep learning techniques to image classification and pattern recognition is a promising approach. Deep learning algorithms model high-level abstractions of data by using multiple processing layers with complex structures. However, even after the initial training period, applying deep learning algorithms can be computationally expensive, particularly for real-time applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
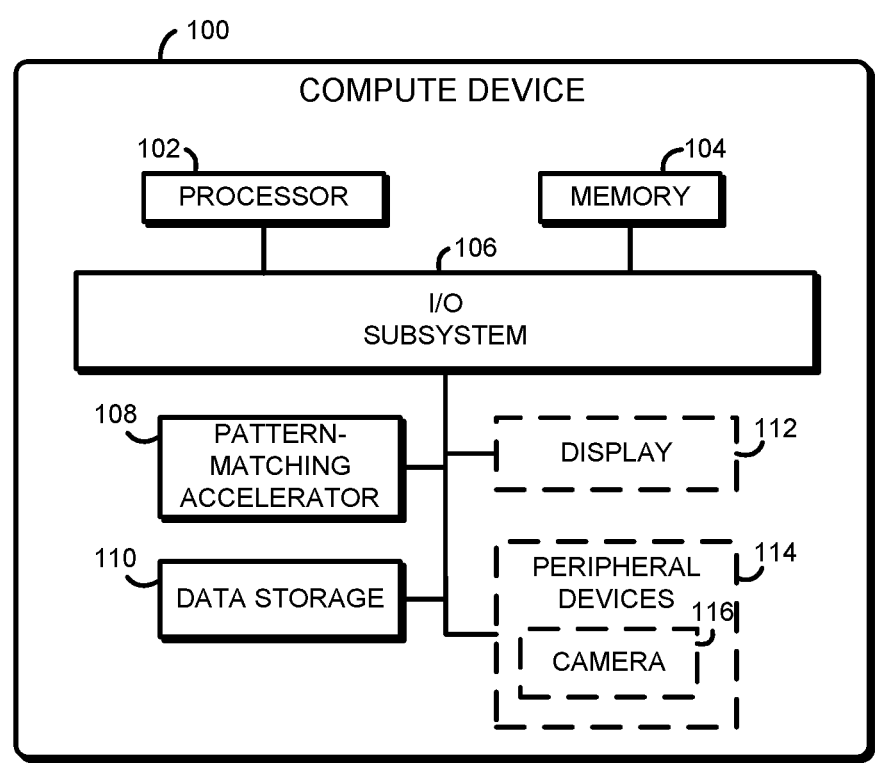
FIG. 1 is a simplified block diagram of at least one embodiment of a compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 for classifying an input vector using sparse coding that is accelerated using a pattern-matching accelerator 108 to facilitate the determination of sparse coding coefficients as discussed in more detail below. For example, in an illustrative use case, the compute device 100 may operate in a training phase and a classification phase. In the training phase, the compute device 100 generates an overcomplete dictionary including several basis vectors which can be used to reconstruct an input vector, such as an image. The compute device 100 may generate the dictionary by optimizing the choice of basis vectors which can be used to reconstruct training vectors, as described in more detail below. The compute device 100 may then use the dictionary to generate sparse coding coefficients for each of the training vectors that are labeled, and use those sparse coding coefficients and corresponding labels to train a classifier, such as a support vector machine (SVM). The classifier may be used to determine certain aspects of the input vector, such as by determining that the corresponding image has an edge or object located at a certain place in the image.

In the classification phase, the compute device 100 determines an input vector (such as by capturing an image with a camera 116). The compute device 100 determines sparse coding coefficients of the input vector with use of the pattern-matching accelerator 108 as discussed above, which requires comparing a test vector with each of the basis vectors of the dictionary. By loading the basis vectors of the dictionary into the pattern-matching accelerator 108, the compute device 100 can compare the test vector with each basis vector simultaneously, and the time required to perform such a comparison does not depend on the number of basis vectors (assuming each basis vector can be stored simultaneously in the pattern-matching accelerator 108). In some embodiments, the pattern-matching accelerator 108 may determine the $L^1$-norm between two vectors. As discussed in more detail below, the $L^1$-norm between two vectors may be defined as the sum of the absolute value of the terms of the difference between the two vectors. After determining the sparse coding coefficients of the input vector, the compute device 100 classifies the input vector based on the sparse coding coefficients by using the classifier that was trained in the training phase.

The compute device 100 may be embodied as any type of compute device capable of performing the functions described herein. For example, the compute device 100 may be embodied as or otherwise be included in, without limitation, an embedded computing system, a System-on-a-Chip (SoC), a desktop computer, a server computer, a tablet computer, a notebook computer, a laptop computer, a smartphone, a cellular phone, a wearable computer, a handset, a messaging device, a camera device, a multiprocessor system, a processor-based system, a consumer electronic device, and/or any other compute device. In some embodiments, the compute device 100 may be embedded in an autonomously-mobile system, such as a self-driving car, an autonomous robot, or a similar system that may benefit from improved real-time image processing based on the functionality of the compute device 100.

The illustrative compute device 100 includes a processor 102, a memory 104, an input/output (I/O) subsystem 106, the pattern-matching accelerator 108, and data storage 110. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The pattern-matching accelerator 108 may be any hardware pattern-matching accelerator that is capable of parallel pattern matching look-up. For example, in some embodiments, the pattern-matching accelerator 108 may be embodied as specialized hardware such as a dedicated co-processor or processing unit. The illustrative pattern-matching accelerator 108, described in more detail in FIGS. 2 & 3, includes an associative memory (also called a content-aware memory), which is capable of comparing the memory contents with input data. In particular, the illustrative pattern-matching accelerator 108 is capable of comparing an input vector with several basis vectors stored in the pattern-matching accelerator 108, and determining the closest k basis vectors to the input vectors. Due to the parallelism of the hardware of the illustrative pattern-matching accelerator 108, the pattern-matching accelerator 108 is able to perform that comparison in constant time, regardless of the number of basis vectors to which the input vector is compared (assuming the associative memory of the pattern-matching accelerator 108 is able to hold all of the basis vectors in question).

The data storage 110 may be embodied as any type of device or devices configured for the short-term or long-term storage of data. For example, the data storage 110 may include any one or more memory devices and circuits, memory cards, hard disk drives, solid-state drives, or other data storage devices.

Of course, in some embodiments, the compute device 100 may include other or additional components, such as those commonly found in a compute device. For example, the compute device 100 may also have a display 112 and/or peripheral devices 114. The peripheral devices 114 may include a keyboard, a mouse, the camera 116, etc. The camera 116 may be embodied as any type of camera capable of sensing or capturing one or more images, such as a charge-coupled device (CCD), a complementary metal-oxide-semiconductor (CMOS) device, and/or other types of image sensor technology.

The display 112 may be embodied as any type of display on which information may be displayed to a user of the compute device 100, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 2:
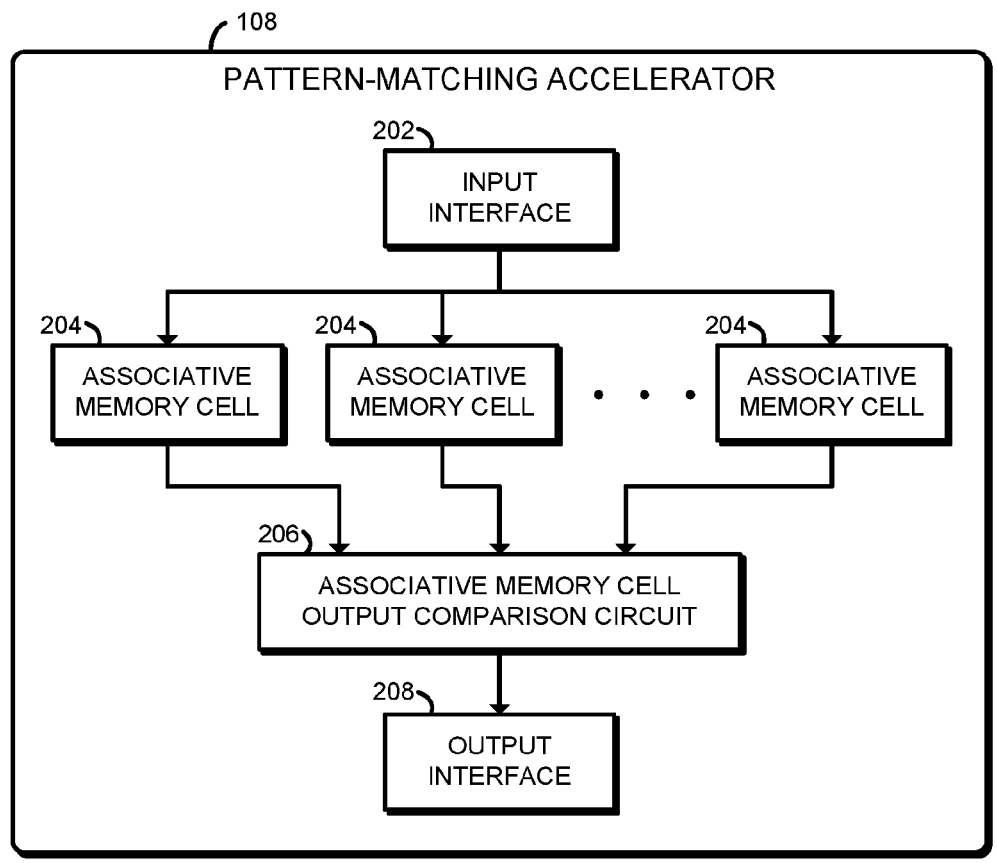
FIG. 2 is a simplified block diagram of at least one embodiment of a pattern-matching accelerator of the compute device of FIG. 1.

Referring now to FIG. 2, the illustrative pattern-matching accelerator 108 includes an input interface 202, several associative memory cells 204, an associative memory cell output comparison circuit 206, and an output interface 208. The input interface 202 is configured to accept an input from the I/O subsystem 106 of the compute device 100 through, e.g., one or more wires. The input interface 202 is communicatively coupled to each of the associative memory cells 204 to provide the input to each of the associative memory cells 204. Each of the associative memory cells 204 is likewise communicatively coupled to the associative memory cell output comparison circuit 206, which is similarly communicatively coupled to the output interface 208.

Figure 3:
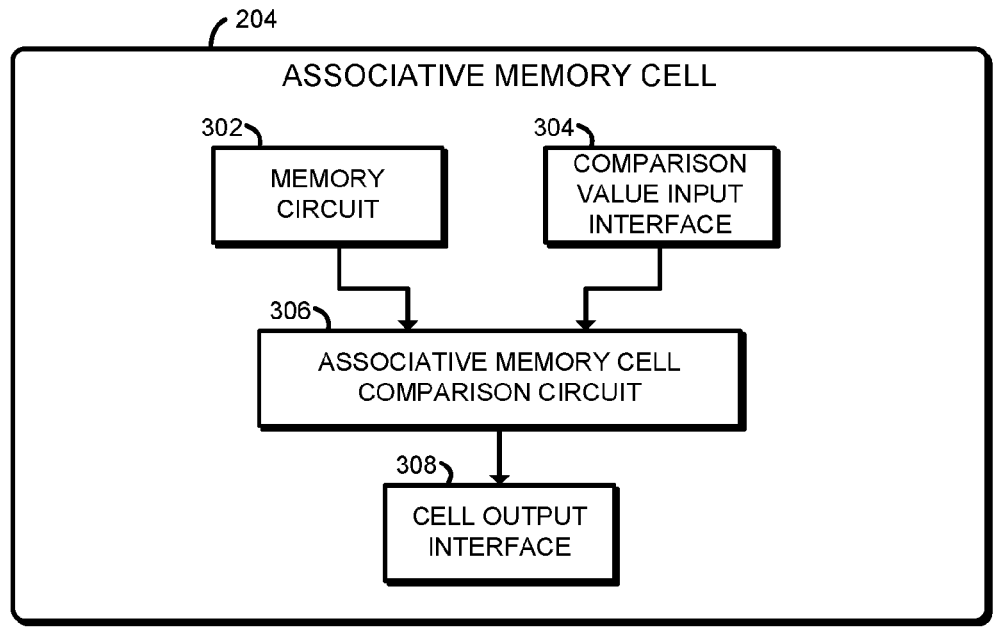
FIG. 3 is a simplified block diagram of at least one embodiment of an associative memory cell of the pattern-matching accelerator of FIG. 2.

As described in more detail in FIG. 3, each associative memory cell 204 is configured to determine a comparison value based on the value stored in the associative memory cell 204 and the comparison value provided to the input interface 202, such as by determining a distance between the two values. The comparison value from each associative memory cell 204 is provided to the associative memory cell output comparison circuit 206. The pattern-matching accelerator 108 may have a large number of associative memory cells 204. For example, in some embodiments, the pattern-matching accelerator 108 may include over 1,000 associative memory cells 204 or over 10,000 associative memory cells 204.

The associative memory cell output comparison circuit 206 is configured to compare all of the values from the associative memory cells 204 and produce one or more output values. In the illustrative embodiment, the associative memory cell output comparison circuit 206 determines the lowest value of the outputs of the associative memory cells 204. In some embodiments, the associative memory cell output comparison circuit 206 may determine the lowest k values of the outputs of the associative memory cells 204, which could be used to implement a k-nearest neighbor (k-NN) algorithm. Additionally or alternatively, the associative memory cell output comparison circuit 206 may be able to perform some weighting and/or averaging of the output values of the associative memory cells 204, such as would be used in a classification method employing a kernel method, such as a radial basis function kernel.

The associative memory cell output comparison circuit 206 is configured to provide the one or more output values to the output interface 208. The output interface 208 is able to interface with the I/O subsystem 106 to allow for the one or more output values to be accessed by other components of the compute device 100.

Referring now to FIG. 3, an illustrative associative memory cell 204 includes a memory circuit 302, a comparison value input interface 304, an associative memory cell comparison circuit 306, and a cell output interface 308. The memory circuit 302 is configured to store a value in the associative memory cell 204, and may be updated by another component of the compute device 100 through the I/O subsystem 106. The memory circuit 302 may be embodied as any type of volatile or non-volatile memory or data storage capable of performing the functions described herein, such as SRAM, DRAM, flash memory, etc. In the illustrative embodiment, the memory circuit 302 may store a basis vector of a dictionary, such as a series of pixel values. Additionally or alternatively, the memory circuit 302 may store data in different formats. The storage size of the memory circuit 302 may be any length, such as more than or equal to 8, 16, 32, 64, 128, 256, 512, 1,024, 2,048, 4,096, 8,192, 16,384, 32,768, 65,536, 131,072, 262,144, 524,288, 1,048,576, 2,097,152, 4,194,304, 8,388,608, or 16,777,216 bits. Of course, in some embodiments, higher-capacity memory circuits may be used.

In some embodiments, the data stored in the memory circuit 302 may be stored as a series of values (e.g., the elements of a basis vector), with each value being stored as 1, 2, 4, 8, 16, 32, or 64 bits. For example, an image that is 100×100 pixels with an 8-bit depth (i.e., 256 values) may have a basis vector with 10,000 elements of 8 bits each which may be stored in the memory circuit 302.

The comparison value input interface 304 is configured to accept a comparison value input from the input interface 202 through, e.g., one or more wires. The associative memory cell comparison circuit 306 is configured to compare the value received by the comparison value input interface 304 with the value stored in the memory circuit 302. In the illustrative embodiment, the value in the memory circuit 302 and the value in the comparison value input interface 304 may both be treated as vectors, and the associative memory cell comparison circuit 306 determines the distance between the vectors. In some embodiments, the associative memory cell comparison circuit 306 may determine the distance between the two vectors by determining an $L^p$-norm of the difference between the two vectors. The $L^p$-norm of a vector x is defined by $\|x\|_p = (|x_1^p| + |x_2^p| + \ldots + |x_n^p|)^{1/p}$. For example, the $L^1$-norm of a vector x is $\|x\|_1 = |x_1| + |x_2| + \ldots |x_n|$, the $L^2$-norm of a vector x is $\|x\|_2 = (|x_1^2| + |x_2^2| + \ldots + |x_n^2|)^{1/2}$ and the $L^\infty$-norm of a vector x is $\|x\|_\infty = \max\{|x_1|, |x_2|, \ldots, |x_n|\}$. The $L^1$-norm is also known as the Manhattan distance, and the $L^2$-norm is also known as the Euclidean distance. In the illustrative embodiment, the associative memory cell comparison circuit 306 is able to determine the $L^1$-norm of the difference between a vector stored in the memory circuit 302 and a vector received by the comparison value input interface 304. Additionally or alternatively, the associative memory cell comparison circuit 306 may be able to determine the $L^\infty$-norm and/or the $L^2$-norm of the difference between a vector stored in the memory circuit 302 and a vector received by the comparison value input interface 304. In some embodiments, the associative memory cell comparison circuit 306 may perform additional processing on the result of the distance, such as by determining a value of a radial basis function.

The associative memory cell comparison circuit 306 is configured to provide the output value to the cell output interface 308. The cell output interface 308 is able to interface with the associative memory cell output comparison circuit 206 through, e.g., one or more wires.

It should be appreciated that the embodiments shown for the pattern-matching accelerator 108, the associative memory cell 204, and the components thereof is merely one illustrative embodiment, and any other embodiment of the pattern-matching accelerator 108 and/or the associative memory cell 204 which perform the functions described above may also be used. For example, in some embodiments, the pattern-matching accelerator 108 and/or associate memory cell 204 may include additional or other components not shown in FIGS. 2 & 3 for clarity of the drawings.

Figure 4:
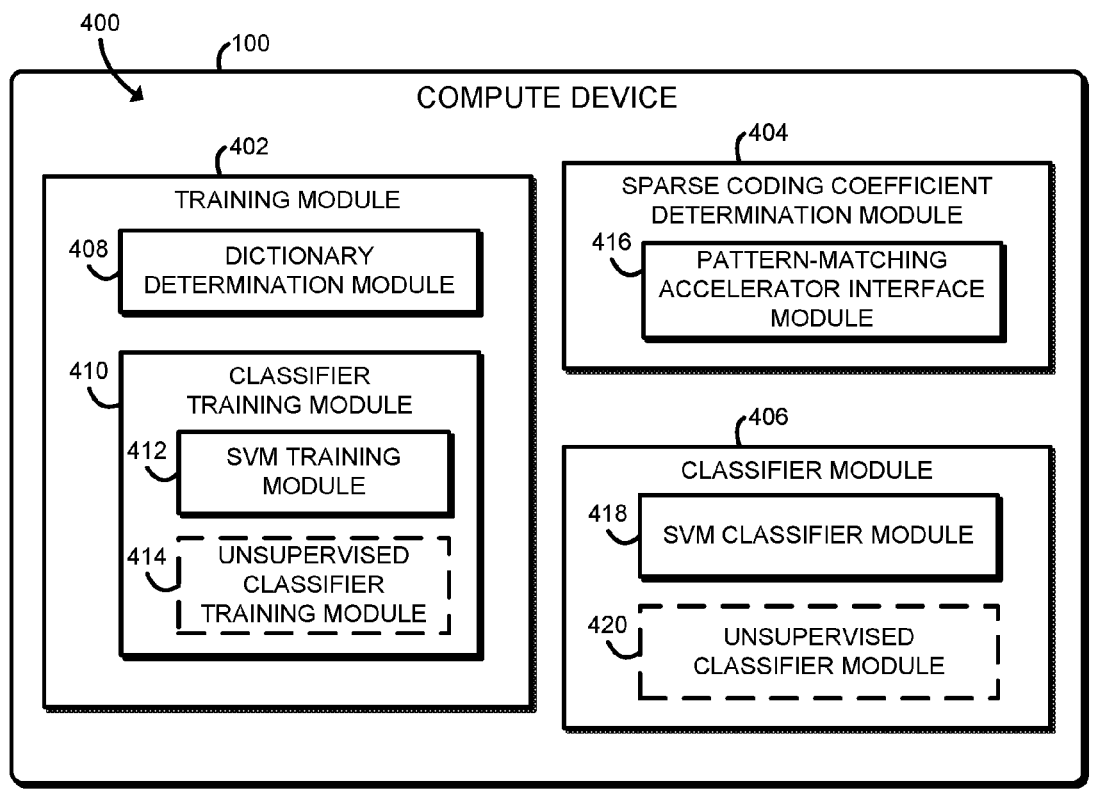
FIG. 4 is a block diagram of at least one embodiment of an environment that may be established by the compute device of FIG. 1.

Referring now to FIG. 4, in use, the compute device 100 may establish an environment 400. The illustrative environment 400 includes a training module 402, a sparse coefficient determination module 404, and a classifier module 406. The various modules of the environment 400 may be embodied as hardware, software, firmware, or a combination thereof. For example, the various modules, logic, and other components of the environment 400 may form a portion of, or otherwise be established by, the processor 102 or other hardware components of the compute device 100. As such, in some embodiments, one or more of the modules of the environment 400 may be embodied as circuitry or collection of electrical devices (e.g., a training circuit 402, a sparse coding coefficient determination circuit 404, a classifier module 406, etc.). It should be appreciated that, in such embodiments, one or more of the circuits (e.g., the training circuit 402, the sparse coding coefficient determination circuit 404, the classifier module 406, etc.) may form a portion of one or more of the processor 102, the memory 104, the I/O subsystem 106, and/or the data storage 110. Additionally, in some embodiments, one or more of the illustrative modules may form a portion of another module and/or one or more of the illustrative modules may be independent of one another.

The training module 402 is configured to determine basis vectors of a dictionary, and train a classifier using the dictionary. The training module 402 includes a dictionary determination module 408 and a classifier training module 410. The dictionary determination module 408 is configured to determine the basis vectors of the dictionary based on training data, which may include labeled and/or unlabeled training vectors. In the illustrative embodiment, the dictionary determination module 408 determines an overcomplete set of basis vectors. Additionally or alternatively, the dictionary determination module 408 may determine an undercomplete set of basis vectors and/or a complete set of basis vectors. In the illustrative embodiment, the basis vectors are normalized, but in other embodiments the basis vectors may not be normalized.

Expressed mathematically, the dictionary may be considered to be a matrix D of N basis vectors, with each basis vector including M elements and forming a single column of the dictionary matrix (so the matrix D is an M×N dimensional matrix). In order to use the basis vectors to represent or approximate an M×1 dimensional input vector f, an N×1 dimensional vector of coefficients x may be multiplied by the dictionary matrix D: f≈Dx. In some instances, such as if the dictionary D is overcomplete, the vector of coefficients x may be able to represent a good approximation (or even an exact representation) of the input vector f with relatively few non-zero coefficients. In other words, the vector of coefficients x may be sparse in those instances. It should be appreciated that each coefficient indicates a magnitude of a corresponding basis vector to be used to form the approximate representation of the input vector. Of course, the contribution of any given basis vector may be negative, so each coefficient may also indicate a sign (i.e., positive or negative) as well as a magnitude.

In the illustrative embodiment, the dictionary determination module 408 determines the set of basis vectors with use of K-SVD, which can be considered a generalization of k-means clustering and makes use of singular value decomposition. In using the K-SVD algorithm, the dictionary determination module 408 determines an initial set of basis vectors (e.g., by randomly determining the basis vectors), determines a set of sparse coefficients based on the initial set of basis vectors, and then updates the dictionary based on the set of sparse coefficients. The dictionary determination module 408 may iteratively repeat the dictionary update process until the dictionary is determined to be acceptable, such as by determining that the change during one iteration of the process is below a threshold, or by determining that the dictionary can be used to generate satisfactory representations of the training vectors. In some embodiments, the dictionary determination module 408 may iteratively repeat the dictionary update process a predetermined number of times. The dictionary determination module 408 may use the sparse coding coefficient determination module 404 in order to determine the set of sparse coefficients used in the iterative process described above. Additionally or alternatively to using the K-SVD algorithm, the dictionary determination module 408 may employ any algorithm for learning a dictionary for use with sparse coding, such as method of optimal directions (MOD), stochastic gradient descent, Lagrange dual method, etc.

The classifier training module 410 is configured to train a classifier based on a set of sparse coding coefficients determined using the dictionary determined by the dictionary determination module 408. The classifier training module 410 is configured to use the sparse coding coefficient determination module 404 to determine a set of sparse coding coefficients for training vectors of the training data. In the illustrative embodiment, the classifier training module 410 includes a support vector machine (SVM) training module 412. The SVM training module 412 is configured to train an SVM classifier based on the sparse coding coefficients of labeled training vectors. Additionally or alternative, the classifier training module 410 may include an unsupervised classifier training module 414, which may be configured to train an unsupervised (or semi-supervised) classifier using sparse coding coefficients of unlabeled training vectors or a combination of labeled and unlabeled training vectors, such as by training a neural network or using support vector clustering. Of course, in some embodiments, a supervised classifier other than an SVM may be used.

The sparse coding coefficient determination module 404 is configured to determine sparse coding coefficients of an input vector based on the dictionary. Each sparse coding coefficient indicates a magnitude of a corresponding basis vector in an approximation of the input vector. Since the basis vectors are chosen to minimize the number of sparse coding coefficients that are required, a good approximation of the input vector can be realized with a relatively small number of non-zero coefficients. In the illustrative embodiment, the sparse coding coefficient determination module 404 determines the sparse coding coefficients with the matching pursuit algorithm or a modified version thereof. In implementing this algorithm, the sparse coding coefficient determination module 404 defines an initial residual vector to be the input vector, and then compares each of the basis vectors of the dictionary to the residual vector. This comparison between a basis vector and the residual vector can be done in several different ways, such as by determining the absolute value of the inner product of the vectors, determining the $L^1$-norm distance of the difference between the vectors, the $L^2$-norm distance of the difference between the vectors, the $L^\infty$-norm distance of the difference between the vectors, etc. Based on this comparison, a basis vector is selected, and a corresponding coefficient is determined which indicates the magnitude of the basis vector in the residual vector. The amount of the basis vector indicated by the coefficient is subtracted from the residual vector, and the residual vector is updated. The process described above is repeated to select another basis vector and corresponding coefficient until a stop condition is reached (such as after determining a certain number of coefficients). In the illustrative embodiment, every time a new basis vector is selected, all of the previous coefficients are updated in order to minimize the length of the residual vector (i.e., minimize the distance between the input vector and the approximation of the input vector based on the sparse coding coefficients).

In the illustrative embodiment, the sparse coding coefficient determination module 404 uses a pattern-matching accelerator interface module 416 to interface with the pattern-matching accelerator 108, which may increase the speed of comparing the residual vector to the basis vectors and thereby increase the speed of determining the sparse coding coefficients. Additionally or alternatively, the sparse coding coefficient determination module 404 may compare the residual vector to the basis vectors by using the processor 102. In the illustrative embodiment, the same comparison metric used for comparing the basis vectors and the residual vector is used for both the training phase and the classification phase, and the same metric is used to minimize the residual vector. In other embodiments, a different metric may be used for the training phase and the classification phase, and/or a different metric may be used for minimizing the residual vector (in either phase) as for comparing the basis vector and the residual vector. For example, during the training phase, the sparse coding coefficient determination module 404 may compare each basis vector to the residual vector using the $L^2$-norm distance, and, during the classification phase, the sparse coding coefficient determination module 404 may compare each basis vector to the residual vector using the $L^1$-norm distance. Similarly, during the classification stage, the sparse coding coefficient determination module 404 may compare each basis vector to the residual vector using the $L^1$-norm distance and minimize the residual vector using the $L^2$-norm distance.

The classifier module 406 is configured to classify an input vector based on the corresponding sparse coding coefficients and the classifier trained by the classifier training module 410. In the illustrative embodiment, the classifier module 406 includes a SVM classifier module 418, which is configured to classify an input vector based on an SVM trained by the SVM training module 412. In some embodiments, a different classifier may be used, such as an unsupervised classifier module 420 (which may include a semi-supervised classification algorithm). Of course, in some embodiments, a supervised classifier other than an SVM may be used.

Figure 5:
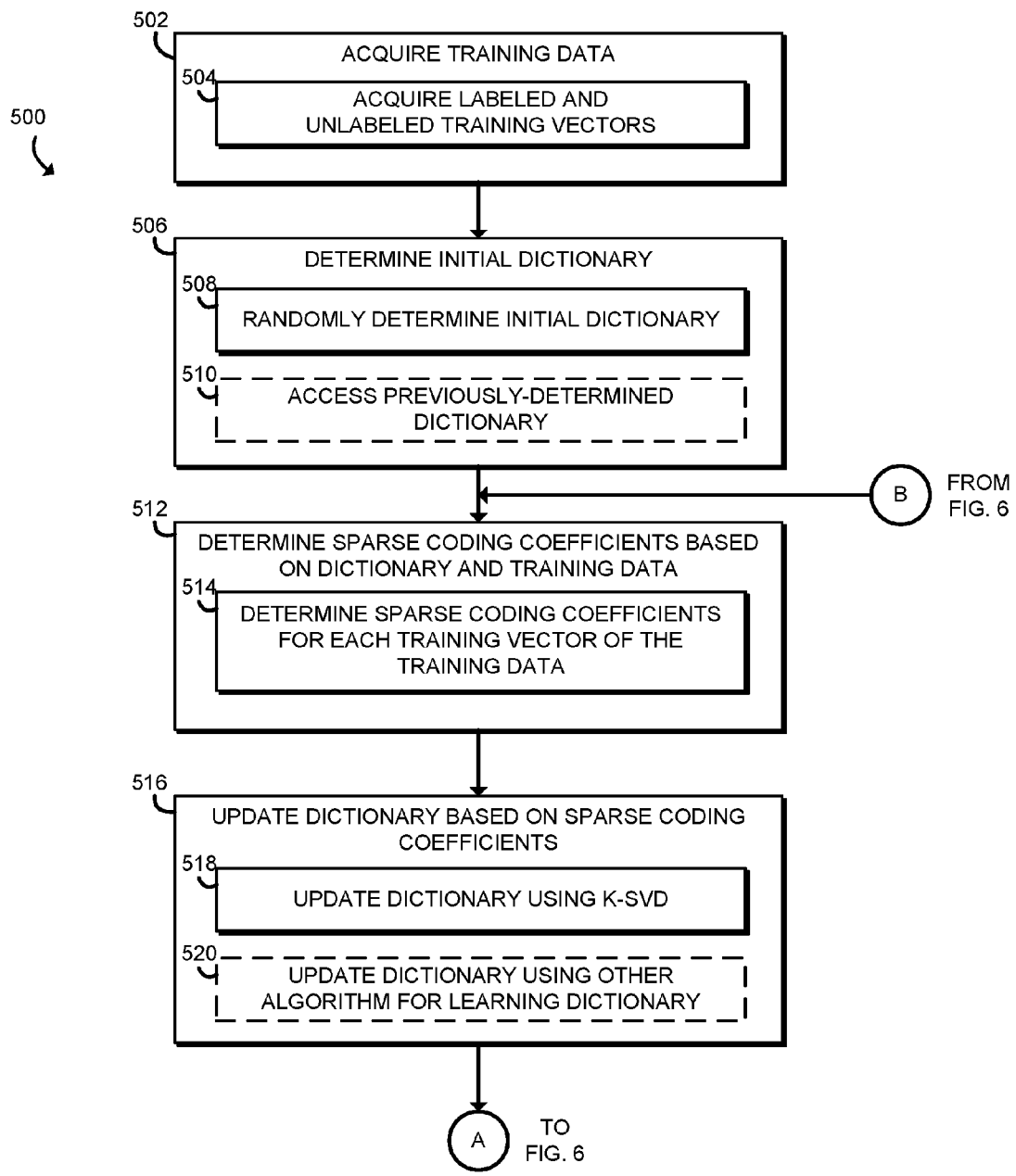
FIGS. 5 & 6 are simplified flow diagrams of at least one embodiment of a method for determining a dictionary and training a classifier by the compute device of FIG. 1.

Referring now to FIG. 5, in use, the compute device 100 may execute a method 500 for learning a dictionary for use with sparse coding. As discussed above, the dictionary is made up of basis vectors, and the basis vectors may form an overcomplete, undercomplete, or complete basis. Note that, in some embodiments, the dictionary may be learned by a different compute device, and then be sent to the compute device 100 for later use. In some embodiments, the method 500 may be executed by one or more of the modules of the environment 400.

The method 500 begins in block 502, in which the compute device 100 acquires training data, which includes several training vectors. The compute device 100 may acquire the training data in any manner, such as by receiving the training data from another compute device, by capturing images with the camera 116, by retrieving the training data from data storage 110, etc. In the illustrative embodiment, the compute device 100 acquires both labeled training vectors and unlabeled training vectors in block 504. In other embodiments, the compute device 100 may acquire only labeled training vectors or only unlabeled training vectors.

In block 506, the compute device 100 determines an initial dictionary. In the illustrative embodiment, the compute device 100 randomly determines an initial dictionary in block 508 (i.e., randomly determine the basis vectors). In other embodiments, the compute device 100 may determine an initial dictionary in another manner, such as by accessing a previously-determined dictionary in block 510. In the illustrative embodiment, the number of basis vectors in the dictionary is fixed and predetermined. In other embodiments, the number of basis vectors in the dictionary may be varied as part of the process of learning the dictionary.

In block 512, the compute device 100 determines sparse coding coefficients based on the current dictionary and the training data. As part of this step, the compute device 100 determines sparse coding coefficients for each training vector of the training data in block 514. The method used to determine the sparse coding coefficients is described in more detail below in regard to FIG. 7.

In block 516, the compute device 100 updates the dictionary based on the sparse coding coefficients in order to minimize the difference between the approximation of the training vectors based on the sparse coding coefficients and the actual training vectors. In the illustrative embodiment, the compute device 100 updates the basis vectors of the dictionary using the K-SVD algorithm in block 518. In other embodiments, the compute device 100 may use any other algorithm for updating a dictionary for use with sparse coding in block 520.

Figure 6:
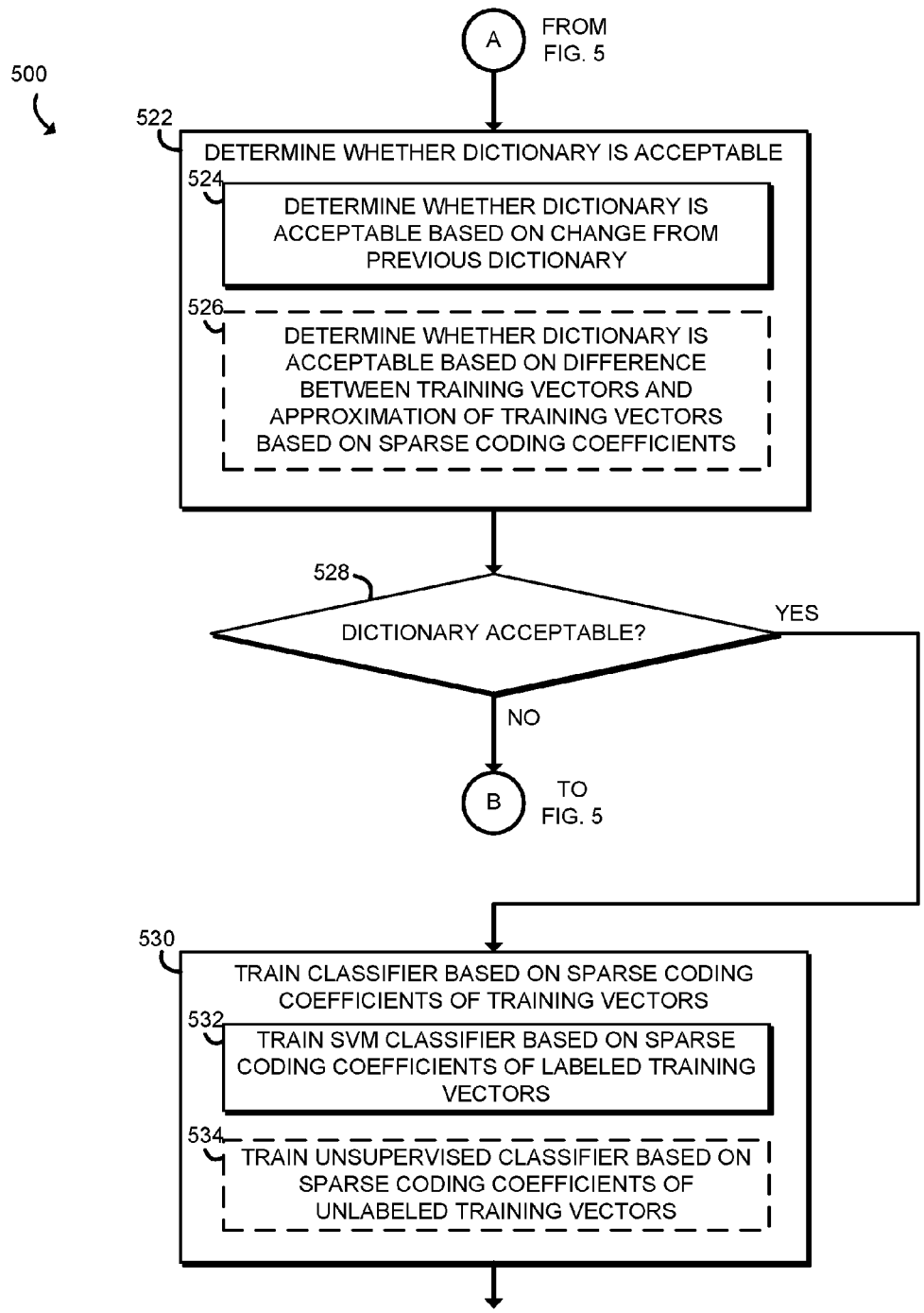

After the compute device 100 has updated the dictionary in block 516, the method 500 proceeds to block 522 of FIG. 6. In block 522, the compute device 100 determines whether the dictionary is acceptable. In the illustrative embodiment, the compute device 100 determines whether the dictionary is acceptable based on how much the dictionary changed from the previous iteration, such as by comparing the amount of the change to a threshold value. In other embodiments, the compute device 100 may determine whether the dictionary is acceptable based on other metrics, such as by determining whether the dictionary is acceptable based on the difference between the training vectors and the approximation of the training vectors based on the sparse coding coefficients in block 526. Of course, in some embodiments, the compute device 100 may determine whether the dictionary is acceptable based on a combination of factors, such as those described in blocks 524 and 526 and/or additional factors such as the number of iterations of the dictionary learning algorithm or the total computation time used.

If the compute device 100 determines that the dictionary is not acceptable in block 528, the method 500 loops back to block 512 of FIG. 5 to perform another iteration of the optimization algorithm to improve the dictionary. If, however, the compute device 100 determines that the dictionary is acceptable, the method 500 advances to block 530 in which the compute device 100 trains a classifier based on the sparse coding coefficients of the training vectors that were determined based on the dictionary during training. In some embodiments, the compute device 100 may update the sparse coding coefficients based on the final dictionary determined in block 516 before training the classifier. In the illustrative embodiment, the compute device 100 trains an SVM classifier based on the sparse coding coefficients of the labeled training vectors. In some embodiments, the compute device 100 may additionally or alternatively train an unsupervised (or semi-supervised) classifier based on the sparse coding coefficients of the unlabeled training vectors (or based on the sparse coding coefficients of both the labeled and unlabeled training vectors) in block 534. Of course, in some embodiments, a supervised classifier other than an SVM may be used.

Figure 7:
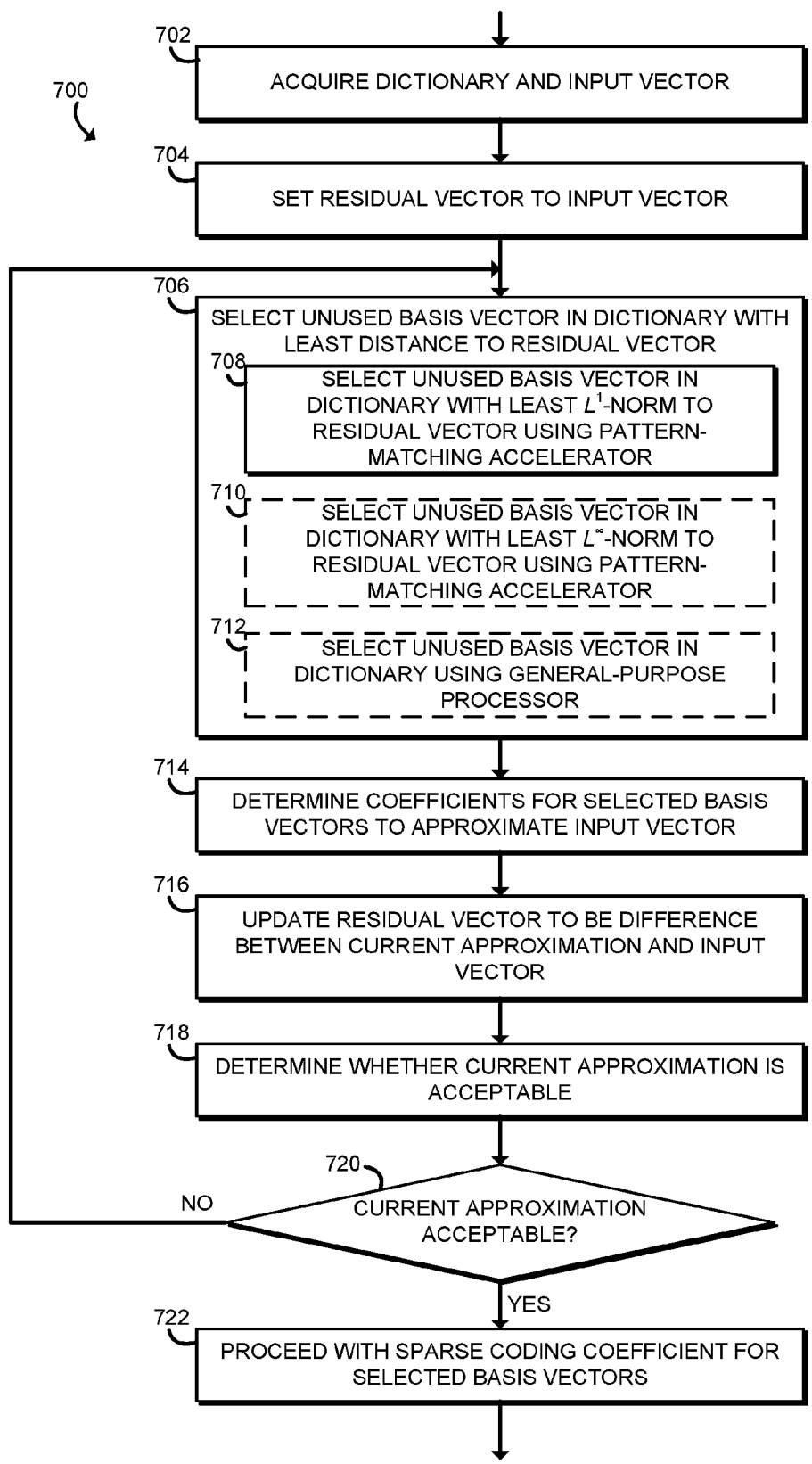
FIG. 7 is a simplified flow diagram of at least one embodiment of a method for determining sparse coding coefficients to represent an input vector by the compute device of FIG. 1.

Referring now to FIG. 7, the compute device 100 may execute a method 700 for determining sparse coding coefficients to represent an input vector based on a dictionary of basis vectors. As discussed above, each coefficient indicates a magnitude of a corresponding basis vector to be used to form an approximate representation of the input vector. Since only a relatively small number of basis vectors may be used to represent the input vector in some embodiments, the vector of coefficients indicating an amount of each of the basis vectors may be sparse (i.e., be mostly zeros). In some embodiments, the method 700 may be executed by one or more of the modules of the environment 400. It should be appreciated that the method 700 may be executed as part of training a dictionary (e.g., as described above in regard to FIGS. 5 & 6) or as part of classifying an input vector (e.g., as described below in regard to FIG. 8), and that some aspects of the method 700 may change depending on the purpose of executing the method 700, as described in more detail below. Since the residual vector may be updated several times during the method 700, the residual vector may assume several intermediate values as the compute device 100 updates the residual vector. Similarly, the sparse coding coefficients and corresponding subset of the basis vectors may be updated several times during the method 700, and may assume several intermediate values.

The method 700 begins in block 702, in which the compute device 100 acquires a dictionary for use with sparse coding and an input vector for which sparse coding coefficients are to be determined. In block 704, the compute device 100 sets the initial value of a residual vector to the input vector.

In block 706, the compute device 100 selects an unused basis vector in the dictionary (i.e., a basis vector that has not yet been selected) with the least distance to the residual vector. In the illustrative embodiment, the compute device 100 loads each basis vector (or each unused basis vector) into a different associative memory cell 204 of the pattern-matching accelerator 108, and determines the $L^1$-norm distance from the residual vector to each basis vector using the pattern-matching accelerator 108, and then selects the basis vector based on those distances in block 708 (such as by selecting the unused basis vector with the least $L^1$-norm distance to the residual vector). In other embodiments, the compute device 100 may determine the $L^\infty$-norm distance from the residual vector to each basis vector using the pattern-matching accelerator 108, and then select the basis vector based on those distances in block 710 (such as by selecting the basis vector with the least $L^\infty$-norm distance to the residual vector). In still other embodiments, the compute device 100 may select the unused basis using the processor 102 in block 712 (such as by determining the largest magnitude inner product or the smallest $L^1$-, $L^2$-, or $L^\infty$-norm distance between the basis vectors and the residual vector).

It should be appreciated that using the pattern-matching accelerator 108, which may in some embodiments only be able to determine the $L^1$-norm distance and/or the $L^\infty$-norm distance, may be able to compare the residual vector with each basis vector in a fixed amount of time, regardless of the number of basis vectors used (as long as each basis vector can be stored in a different associative memory cell 204 of the pattern-matching accelerator 108). As such, using the pattern-matching accelerator 108 may be significantly faster than using the processor 102, and may be particularly useful in time-sensitive applications. However, in some cases, selecting the basis vector based on $L^1$-norm distance or $L^\infty$-norm distance may not result in as good of results as selecting the basis vector based on the inner product or $L^2$-norm distance. Because of this difference, the compute device 100 may determine how to select the next basis vector based on the intended application. For example, when classifying input vectors, the compute device 100 may use the pattern-matching accelerator 108 (and the $L^1$-norm distance), and when training the dictionary, the compute device 100 may use the processor 102 (and the $L^2$-norm distance and/or the inner product).

In block 714, the compute device 100 computes sparse coding coefficients for the selected basis vectors to approximate the input vector. In the illustrative embodiment, the compute device 100 determines the sparse coding coefficients which minimize the distance between the approximation of the input vector and the input vector. The compute device 100 may do so using any suitable optimization algorithm, such as by starting with the previous intermediate sparse coding coefficients and making a small modification of them to generate updated intermediate sparse coding coefficients, determining a test residual vector based on the updated intermediate sparse coding coefficients, and determining a length of the test residual vector.

The distance metric used to minimize the distance may be the $L^1$-, $L^2$-, and/or $L^\infty$-norm distance, and may, in some embodiments, depend on the application. For example, the compute device 100 may minimize the distance using the $L^1$-norm distance if, in block 706, the compute device 100 used the $L^1$-norm distance, may minimize the distance using the $L^2$-norm distance if, in block 706, the compute device 100 used the $L^2$-norm distance, and may minimize the distance using the $L^\infty$-norm distance if, in block 706, the compute device 100 used the $L^\infty$-norm distance. Of course, in some cases, the compute device 100 may use a different distance metric in determining the sparse coding coefficients as that used in block 706, such as by using the $L^1$-norm distance in block 706 and the $L^2$-norm distance in block 714.

In block 716, the compute device 100 updates the residual vector to be the difference between the input vector and the current approximation of the input vector based on the sparse coding coefficients. In block 718, the compute device 100 determines whether the current approximation of the input vector is acceptable, such as by determining if a certain number of coefficients are non-zero or by determining that the magnitude of the residual vector is below a threshold value. If, in block 720, the compute device 100 determines that the current approximation is not acceptable, the method 700 loops back to block 706 in which the compute device 100 selects another unused basis vector in the dictionary. If, however, the current approximation is acceptable in block 720, the method 700 proceeds to block 722. In block 722, the method 700 proceeds with the sparse coding coefficients for the selected basis vectors, such as by continuing from block 512 in FIG. 5.

Figure 8:
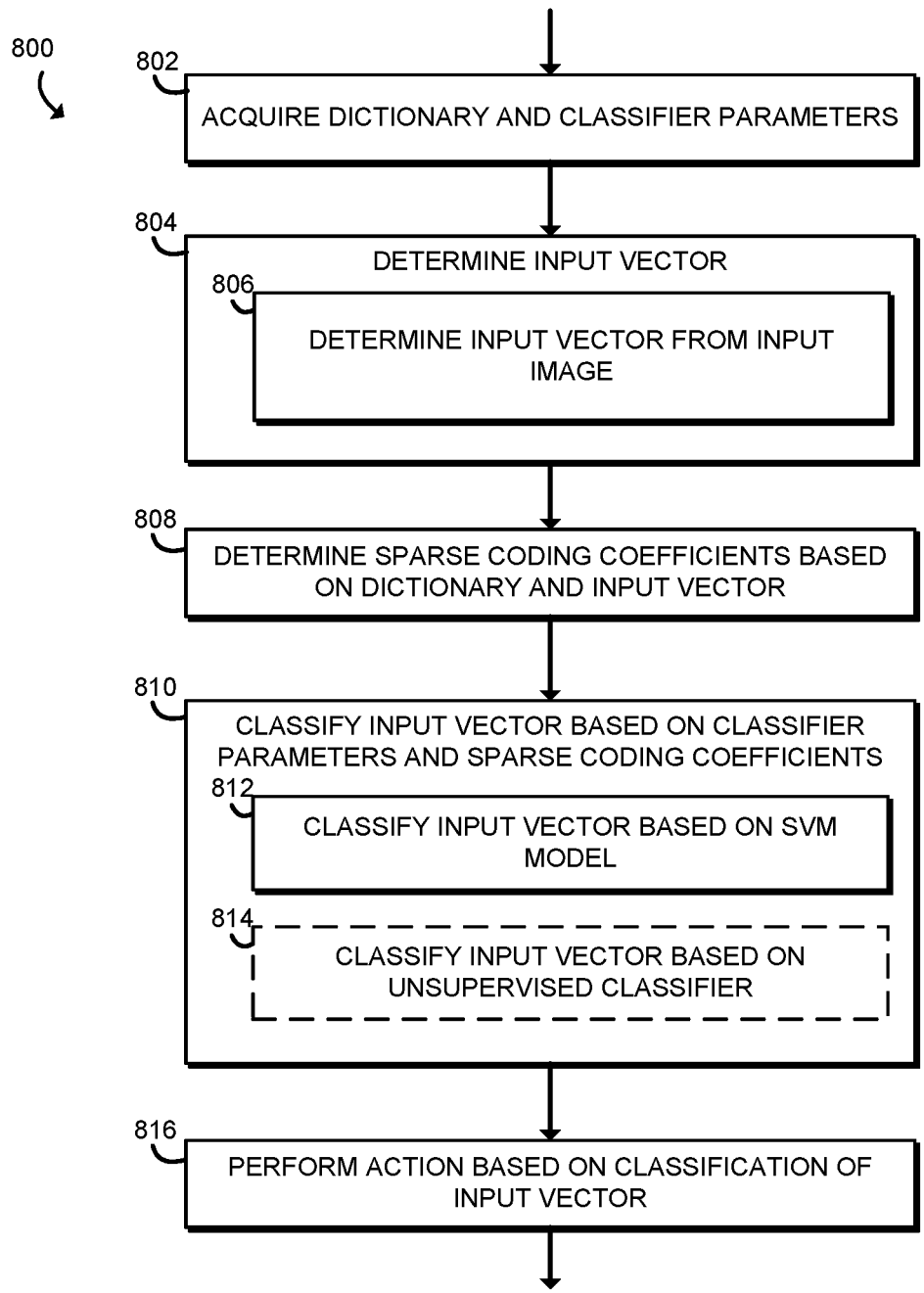
FIG. 8 is a simplified flow diagram of at least one embodiment of a method for classifying an input vector by the compute device of FIG. 1.

Referring now to FIG. 8, in use, the compute device 100 may execute a method 800 for classifying an input vector. In some embodiments, the method 800 may be executed by one or more of the modules of the environment 400. The method 800 begins in block 802, in which the compute device 100 acquires a dictionary and classifier parameters. In the illustrative embodiment, the compute device 100 determines the dictionary and the classifier parameters by executing the method 500 of FIGS. 5 & 6. In other embodiments, the compute device 100 may receive the dictionary and/or the classifier parameters from another compute device, and/or the compute device 100 may retrieve the dictionary and/or the classifier parameters from the data storage 110.

In block 804, the compute device 100 determines the input vector. In the illustrative embodiment, the compute device 100 determines the input vector from an input image, such as by receiving an image from another compute device 100 or by capturing an image with the camera 116. For example, the input vector may have one element for each pixel of the image (or, if the image is in color, three elements for each pixel).

In block 808, the compute device 100 determines sparse coding coefficients based on the dictionary and the input vector. The method used to determine the sparse coding coefficients is described in more detail above in regard to FIG. 7.

In block 810, the compute device 100 classifies the input vector based on the classifier parameters and the sparse coding coefficients. In the illustrative embodiment, the compute device 100 classifies the input vector based on an SVM model in block 812. Additionally or alternatively, in some embodiments, the compute device 100 classifies the input vector based on an unsupervised (or semi-supervised) classifier in block 814. Of course, in some embodiments, a supervised classifier other than an SVM may be used.

In block 816, the compute device 100 performs an action based on the classification of the input vector. For example, if the compute device 100 is embedded in a computer-vision-aided navigation system, the compute device 100 may determine a desired course to avoid an obstacle that is recognized by the classifier.

Examples

Illustrative examples of the devices, systems, and methods disclosed herein are provided below. An embodiment of the devices, systems, and methods may include any one or more, and any combination of, the examples described below.

Example 1 includes a compute device for classifying an input vector, the compute device comprising a pattern-matching accelerator; a memory having stored thereon (i) the input vector, (ii) a dictionary comprising a plurality of basis vectors, and (iii) one or more classifier parameters; a sparse coding coefficient module to determine, with use of the pattern-matching accelerator, a plurality of sparse coding coefficients based on the dictionary and the input vector, wherein (i) each of the plurality of sparse coding coefficients is indicative of a magnitude of a corresponding basis vector of the plurality of basis vectors and (ii) the plurality of sparse coding coefficients define an approximation of the input vector, and wherein to determine the plurality of sparse coding coefficients comprises to determine, by the pattern-matching accelerator, an L1-norm distance from a residual vector to each of the plurality of basis vectors; and a classifier module to classify the input vector based on the plurality of sparse coding coefficients and the one or more classifier parameters.

Example 2 includes the subject matter of Example 1, and wherein to determine the plurality of sparse coding coefficients comprises to determine an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector; determine the residual vector based on the intermediate plurality of sparse coding coefficients, wherein the residual vector indicates a difference between the input vector and the intermediate approximation of the input vector; select, based on the L1-norm distances from the residual vector to each of the plurality of basis vectors, an additional basis vector of the plurality of basis vectors; update the intermediate subset of the plurality of basis vectors to include the additional basis vector; and determine an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

Example 3 includes the subject matter of any of Examples 1 and 2, and wherein to determine the updated intermediate plurality of sparse coding coefficients comprises to determine an L2-norm distance between the input vector and a test residual vector, wherein the test residual vector comprises a magnitude of each of the updated intermediate subset of the plurality of basis vectors.

Example 4 includes the subject matter of any of Examples 1-3, and wherein to determine the updated intermediate plurality of sparse coding coefficients comprises to determine an L1-norm distance between the input vector and a test residual vector, wherein the test residual vector comprises a magnitude of each of the updated intermediate subset of the plurality of basis vectors.

Example 5 includes the subject matter of any of Examples 1-4, and wherein to select the additional basis vector of the plurality of basis vectors comprises to select the basis vector having the least L1-norm distance to the residual vector.

Example 6 includes the subject matter of any of Examples 1-5, and wherein to determine the L1-norm distance from the residual vector to each of the plurality of basis vectors comprises to load each of the plurality of basis vectors into a different memory location of an associative memory of the pattern-matching accelerator; and to determine an L1-norm distance from each of the plurality of basis vectors to the residual vector by each of the corresponding different memory locations.

Example 7 includes the subject matter of any of Examples 1-6, and wherein the plurality of basis vectors comprises at least one thousand basis vectors.

Example 8 includes the subject matter of any of Examples 1-7, and wherein the plurality of basis vectors comprises at least ten thousand basis vectors.

Example 9 includes the subject matter of any of Examples 1-8, and wherein to acquire the dictionary comprises to acquire training data comprising a plurality of training vectors; determine an initial dictionary; determine a plurality of training sparse coding coefficients based on the initial dictionary for each of the plurality of training vectors; update the initial dictionary based on the pluralities of training sparse coding coefficients; and determine the dictionary based on the updated initial dictionary.

Example 10 includes the subject matter of any of Examples 1-9, and wherein to determine the plurality of training sparse coding coefficients based on the initial dictionary for each of the plurality of training vectors comprises to determine an L2-norm distance from a training residual vector to each of the plurality of basis vectors for each of the plurality of training vectors.

Example 11 includes the subject matter of any of Examples 1-10, and wherein to determine the plurality of training sparse coding coefficients based on the initial dictionary for each of the plurality of training vectors comprises to determine, by the pattern-matching accelerator, an L1-norm distance from a training residual vector to each of the plurality of basis vectors for each of the plurality of training vectors.

Example 12 includes the subject matter of any of Examples 1-11, and wherein to determine the plurality of training sparse coding coefficients based on the initial dictionary for each of the plurality of training vectors comprises to determine a magnitude of a dot product of a training residual vector and each of the plurality of basis vectors for each of the plurality of training vectors.

Example 13 includes the subject matter of any of Examples 1-12, and wherein to update the initial dictionary based on the pluralities of training sparse coding coefficients comprises to update the initial dictionary with use of K-SVD.

Example 14 includes the subject matter of any of Examples 1-13, and wherein the plurality of training vectors comprises a plurality of labeled training vectors and a plurality of unlabeled training vectors, wherein to acquire the one or more classifier parameters comprises to determine a plurality of labeled training sparse coding coefficients for each of the plurality of labeled training vectors based on the dictionary; and train a support vector machine based on the plurality of labeled training sparse coding coefficients to generate the one or more classifier parameters, wherein to classify the input vector based on the plurality of sparse coding coefficients comprises to classify the input vector with use of the support vector machine.

Example 15 includes a method for classifying an input vector by a compute device, the method comprising acquiring, by the compute device, (i) the input vector, (ii) a dictionary comprising a plurality of basis vectors, and (iii) one or more classifier parameters; determining, by the compute device and with use of a pattern-matching accelerator of the compute device, a plurality of sparse coding coefficients based on the dictionary and the input vector, wherein (i) each of the plurality of sparse coding coefficients is indicative of a magnitude of a corresponding basis vector of the plurality of basis vectors and (ii) the plurality of sparse coding coefficients define an approximation of the input vector, and wherein determining the plurality of sparse coding coefficients comprises determining, by the pattern-matching accelerator, an L1-norm distance from a residual vector to each of the plurality of basis vectors; and classifying, by the compute device, the input vector based on the plurality of sparse coding coefficients and the one or more classifier parameters.

Example 16 includes the subject matter of Example 15, and wherein determining the plurality of sparse coding coefficients comprises determining, by the compute device, an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector; determining, by the compute device, the residual vector based on the intermediate plurality of sparse coding coefficients, wherein the residual vector indicates a difference between the input vector and the intermediate approximation of the input vector; selecting, by the compute device and based on the L1-norm distances from the residual vector to each of the plurality of basis vectors, an additional basis vector of the plurality of basis vectors; updating, by the compute device, the intermediate subset of the plurality of basis vectors to include the additional basis vector; and determining, by the compute device, an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

Example 17 includes the subject matter of any of Examples 15 and 16, and wherein determining the updated intermediate plurality of sparse coding coefficients comprises determining an L2-norm distance between the input vector and a test residual vector, wherein the test residual vector comprises a magnitude of each of the updated intermediate subset of the plurality of basis vectors.

Example 18 includes the subject matter of any of Examples 15-17, and wherein determining the updated intermediate plurality of sparse coding coefficients comprises determining an L1-norm distance between the input vector and a test residual vector, wherein the test residual vector comprises a magnitude of each of the updated intermediate subset of the plurality of basis vectors.

Example 19 includes the subject matter of any of Examples 15-18, and wherein selecting the additional basis vector of the plurality of basis vectors comprises selecting, by the compute device, the basis vector having the least L1-norm distance to the residual vector.

Example 20 includes the subject matter of any of Examples 15-19, and wherein determining the L1-norm distance from the residual vector to each of the plurality of basis vectors comprises loading each of the plurality of basis vectors into a different memory location of an associative memory of the pattern-matching accelerator; and determining an L1-norm distance from each of the plurality of basis vectors to the residual vector by each of the corresponding different memory locations.

Example 21 includes the subject matter of any of Examples 15-20, and wherein the plurality of basis vectors comprises at least one thousand basis vectors.

Example 22 includes the subject matter of any of Examples 15-21, and wherein the plurality of basis vectors comprises at least ten thousand basis vectors.

Example 23 includes the subject matter of any of Examples 15-22, and wherein acquiring the dictionary comprises acquiring, by the compute device, training data comprising a plurality of training vectors; determining, by the compute device, an initial dictionary; determining, by the compute device, a plurality of training sparse coding coefficients based on the initial dictionary for each of the plurality of training vectors; updating, by the compute device, the initial dictionary based on the pluralities of training sparse coding coefficients; and determining, by the compute device, the dictionary based on the updated initial dictionary.

Example 24 includes the subject matter of any of Examples 15-23, and wherein determining the plurality of training sparse coding coefficients based on the initial dictionary for each of the plurality of training vectors comprises determining, by the compute device, an L2-norm distance from a training residual vector to each of the plurality of basis vectors for each of the plurality of training vectors.

Example 25 includes the subject matter of any of Examples 15-24, and wherein determining the plurality of training sparse coding coefficients based on the initial dictionary for each of the plurality of training vectors comprises determining, by the pattern-matching accelerator, an L1-norm distance from a training residual vector to each of the plurality of basis vectors for each of the plurality of training vectors.

Example 26 includes the subject matter of any of Examples 15-25, and wherein determining the plurality of training sparse coding coefficients based on the initial dictionary for each of the plurality of training vectors comprises determining, by the compute device, a magnitude of a dot product of a training residual vector and each of the plurality of basis vectors for each of the plurality of training vectors.

Example 27 includes the subject matter of any of Examples 15-26, and wherein updating the initial dictionary based on the pluralities of training sparse coding coefficients comprises updating the initial dictionary with use of K-SVD.

Example 28 includes the subject matter of any of Examples 15-27, and wherein the plurality of training vectors comprises a plurality of labeled training vectors and a plurality of unlabeled training vectors, wherein acquiring the one or more classifier parameters comprises determining, by the compute device, a plurality of labeled training sparse coding coefficients for each of the plurality of labeled training vectors based on the dictionary; and training, by the compute device, a support vector machine based on the plurality of labeled training sparse coding coefficients to generate the one or more classifier parameters, wherein classifying the input vector based on the plurality of sparse coding coefficients comprises classifying, by the compute device, the input vector with use of the support vector machine.

Example 29 includes one or more computer readable media comprising a plurality of instructions stored thereon that, when executed, cause a compute device to perform the method of any of examples 15-28.

Example 30 includes a compute device for classifying an input vector, the compute device comprising means for acquiring (i) the input vector, (ii) a dictionary comprising a plurality of basis vectors, and (iii) one or more classifier parameters; means for determining, with use of a pattern-matching accelerator of the compute device, a plurality of sparse coding coefficients based on the dictionary and the input vector, wherein (i) each of the plurality of sparse coding coefficients is indicative of a magnitude of a corresponding basis vector of the plurality of basis vectors and (ii) the plurality of sparse coding coefficients define an approximation of the input vector, and wherein the means for determining the plurality of sparse coding coefficients comprises means for determining, by the pattern-matching accelerator, an L1-norm distance from a residual vector to each of the plurality of basis vectors; and means for classifying the input vector based on the plurality of sparse coding coefficients and the one or more classifier parameters.

Example 31 includes the subject matter of Example 30, and wherein the means for determining the plurality of sparse coding coefficients comprises means for determining an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector; means for determining the residual vector based on the intermediate plurality of sparse coding coefficients, wherein the residual vector indicates a difference between the input vector and the intermediate approximation of the input vector; means for selecting, based on the L1-norm distances from the residual vector to each of the plurality of basis vectors, an additional basis vector of the plurality of basis vectors; means for updating the intermediate subset of the plurality of basis vectors to include the additional basis vector; and means for determining an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

Example 32 includes the subject matter of any of Examples 30 and 31, and wherein the means for determining the updated intermediate plurality of sparse coding coefficients comprises means for determining an L2-norm distance between the input vector and a test residual vector, wherein the test residual vector comprises a magnitude of each of the updated intermediate subset of the plurality of basis vectors.

Example 33 includes the subject matter of any of Examples 30-32, and wherein the means for determining the updated intermediate plurality of sparse coding coefficients comprises means for determining an L1-norm distance between the input vector and a test residual vector, wherein the test residual vector comprises a magnitude of each of the updated intermediate subset of the plurality of basis vectors.

Example 34 includes the subject matter of any of Examples 30-33, and wherein the means for selecting the additional basis vector of the plurality of basis vectors comprises means for selecting the basis vector having the least L1-norm distance to the residual vector.

Example 35 includes the subject matter of any of Examples 30-34, and wherein the means for determining the L1-norm distance from the residual vector to each of the plurality of basis vectors comprises means for loading each of the plurality of basis vectors into a different memory location of an associative memory of the pattern-matching accelerator; and means for determining an L1-norm distance from each of the plurality of basis vectors to the residual vector by each of the corresponding different memory locations.

Example 36 includes the subject matter of any of Examples 30-35, and wherein the plurality of basis vectors comprises at least one thousand basis vectors.

Example 37 includes the subject matter of any of Examples 30-36, and wherein the plurality of basis vectors comprises at least ten thousand basis vectors.

Example 38 includes the subject matter of any of Examples 30-37, and wherein acquiring the dictionary comprises means for acquiring training data comprising a plurality of training vectors; means for determining an initial dictionary; means for determining a plurality of training sparse coding coefficients based on the initial dictionary for each of the plurality of training vectors; means for updating the initial dictionary based on the pluralities of training sparse coding coefficients; and means for determining the dictionary based on the updated initial dictionary.

Example 39 includes the subject matter of any of Examples 30-38, and wherein the means for determining the plurality of training sparse coding coefficients based on the initial dictionary for each of the plurality of training vectors comprises means for determining an L2-norm distance from a training residual vector to each of the plurality of basis vectors for each of the plurality of training vectors.

Example 40 includes the subject matter of any of Examples 30-39, and wherein the means for determining the plurality of training sparse coding coefficients based on the initial dictionary for each of the plurality of training vectors comprises means for determining, by the pattern-matching accelerator, an L1-norm distance from a training residual vector to each of the plurality of basis vectors for each of the plurality of training vectors.

Example 41 includes the subject matter of any of Examples 30-40, and wherein the means for determining the plurality of training sparse coding coefficients based on the initial dictionary for each of the plurality of training vectors comprises means for determining a magnitude of a dot product of a training residual vector and each of the plurality of basis vectors for each of the plurality of training vectors.

Example 42 includes the subject matter of any of Examples 30-41, and wherein the means for updating the initial dictionary based on the pluralities of training sparse coding coefficients comprises means for updating the initial dictionary with use of K-SVD.

Example 43 includes the subject matter of any of Examples 30-42, and wherein the plurality of training vectors comprises a plurality of labeled training vectors and a plurality of unlabeled training vectors, wherein the means for acquiring the one or more classifier parameters comprises means for determining a plurality of labeled training sparse coding coefficients for each of the plurality of labeled training vectors based on the dictionary; and means for training a support vector machine based on the plurality of labeled training sparse coding coefficients to generate the one or more classifier parameters, wherein the means for classifying the input vector based on the plurality of sparse coding coefficients comprises means for classifying the input vector with use of the support vector machine.

The invention claimed is:

1. A compute device for classifying an input vector, the compute device comprising:
a hardware pattern-matching accelerator comprising a plurality of pattern-matching hardware components, each of the plurality of pattern-matching hardware components physically structured to determine an $L^1$-norm from a first vector to a second vector, wherein the plurality of pattern-matching hardware components are operable in parallel such that the hardware pattern-matching accelerator is able to determine an $L^1$-norm from a first vector to each of a plurality of second vectors in parallel;
a memory having stored thereon (i) the input vector, (ii) a dictionary comprising a plurality of basis vectors, and (iii) one or more classifier parameters;
a sparse coding coefficient module to determine, with use of the hardware pattern-matching accelerator, a plurality of sparse coding coefficients based on the dictionary and the input vector, wherein (i) each of the plurality of sparse coding coefficients is indicative of a magnitude of a corresponding basis vector of the plurality of basis vectors and (ii) the plurality of sparse coding coefficients define an approximation of the input vector, and wherein to determine the plurality of sparse coding coefficients comprises to determine, by the hardware pattern-matching accelerator and in parallel, an $L^1$-norm distance from a residual vector to each of the plurality of basis vectors; and
a classifier module to classify the input vector based on the plurality of sparse coding coefficients and the one or more classifier parameters.

2. The compute device of claim 1, wherein to determine the plurality of sparse coding coefficients comprises to:
determine an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector;
determine the residual vector based on the intermediate plurality of sparse coding coefficients, wherein the residual vector indicates a difference between the input vector and the intermediate approximation of the input vector;
select, based on the $L^1$-norm distances from the residual vector to each of the plurality of basis vectors, an additional basis vector of the plurality of basis vectors;
update the intermediate subset of the plurality of basis vectors to include the additional basis vector; and
determine an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

3. The compute device of claim 2, wherein to determine the updated intermediate plurality of sparse coding coefficients comprises to determine an $L^2$-norm distance between the input vector and a test residual vector, wherein the test residual vector comprises a magnitude of each of the updated intermediate subset of the plurality of basis vectors.

4. The compute device of claim 2, wherein to determine the updated intermediate plurality of sparse coding coefficients comprises to determine an $L^1$-norm distance between the input vector and a test residual vector, wherein the test residual vector comprises a magnitude of each of the updated intermediate subset of the plurality of basis vectors.

5. The compute device of claim 1, wherein to determine the $L^1$-norm distance from the residual vector to each of the plurality of basis vectors comprises to:
load each of the plurality of basis vectors into a different memory location of an associative memory of the pattern-matching accelerator; and
determine an $L^1$-norm distance from each of the plurality of basis vectors to the residual vector by each of the corresponding different memory locations.

6. The compute device of claim 5, wherein the plurality of basis vectors comprises at least one thousand basis vectors, wherein to load each of the plurality of basis vectors into a different memory location of the associative memory comprises to load each of the at least one thousand basis vectors into a different memory location of the associative memory.

7. The compute device of claim 1, wherein to acquire the dictionary comprises to:
acquire training data comprising a plurality of training vectors;
determine an initial dictionary;
determine a plurality of training sparse coding coefficients based on the initial dictionary for each of the plurality of training vectors;
update the initial dictionary based on the pluralities of training sparse coding coefficients; and
determine the dictionary based on the updated initial dictionary.

8. The compute device of claim 7, wherein to determine the plurality of training sparse coding coefficients based on the initial dictionary for each of the plurality of training vectors comprises to determine an $L^2$-norm distance from a training residual vector to each of the plurality of basis vectors for each of the plurality of training vectors.

9. The compute device of claim 7, wherein the plurality of training vectors comprises a plurality of labeled training vectors and a plurality of unlabeled training vectors, wherein to acquire the one or more classifier parameters comprises to:

determine a plurality of labeled training sparse coding coefficients for each of the plurality of labeled training vectors based on the dictionary; and train a support vector machine based on the plurality of labeled training sparse coding coefficients to generate the one or more classifier parameters, wherein to classify the input vector based on the plurality of sparse coding coefficients comprises to classify the input vector with use of the support vector machine.

10. A method for classifying an input vector by a compute device, the method comprising:

acquiring, by the compute device, (i) the input vector, (ii) a dictionary comprising a plurality of basis vectors, and (iii) one or more classifier parameters;

determining, by the compute device and with use of a hardware pattern-matching accelerator of the compute device, a plurality of sparse coding coefficients based on the dictionary and the input vector, wherein (i) each of the plurality of sparse coding coefficients is indicative of a magnitude of a corresponding basis vector of the plurality of basis vectors, and (iii) the plurality of sparse coding coefficients define an approximation of the input vector, and wherein determining the plurality of sparse coding coefficients comprises determining, by the hardware pattern-matching accelerator and in parallel, an $L^1$-norm distance from a residual vector to each of the plurality of basis vectors, wherein the hardware pattern-matching accelerator comprises a plurality of pattern-matching hardware components, each of the plurality of pattern-matching hardware components physically structured to determine an $L^1$-norm from a first vector to a second vector, wherein the plurality of pattern-matching hardware components are operable in parallel such that the hardware pattern-matching accelerator is able to determine an $L^1$-norm from a first vector to each of a plurality of second vectors in parallel; and classifying, by the compute device, the input vector based on the plurality of sparse coding coefficients and the one or more classifier parameters.

11. The method of claim 10, wherein determining the plurality of sparse coding coefficients comprises:

determining, by the compute device, an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector;

determining, by the compute device, the residual vector based on the intermediate plurality of sparse coding coefficients, wherein the residual vector indicates a difference between the input vector and the intermediate approximation of the input vector;

selecting, by the compute device and based on the $L^1$-norm distances from the residual vector to each of the plurality of basis vectors, an additional basis vector of the plurality of basis vectors;

updating, by the compute device, the intermediate subset of the plurality of basis vectors to include the additional basis vector; and determining, by the compute device, an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

12. The method of claim 11, wherein determining the updated intermediate plurality of sparse coding coefficients comprises determining an $L^2$-norm distance between the input vector and a test residual vector, wherein the test residual vector comprises a magnitude of each of the updated intermediate subset of the plurality of basis vectors.

13. The method of claim 10, wherein determining the $L^1$-norm distance from the residual vector to each of the plurality of basis vectors comprises:

loading each of the plurality of basis vectors into a different memory location of an associative memory of the pattern-matching accelerator; and determining an $L^1$-norm distance from each of the plurality of basis vectors to the residual vector by each of the corresponding different memory locations.

14. The method of claim 13, wherein the plurality of basis vectors comprises at least one thousand basis vectors.

15. The method of claim 10, wherein acquiring the dictionary comprises:

acquiring, by the compute device, training data comprising a plurality of training vectors;

determining, by the compute device, an initial dictionary;

determining, by the compute device, a plurality of training sparse coding coefficients based on the initial dictionary for each of the plurality of training vectors;

updating, by the compute device, the initial dictionary based on the pluralities of training sparse coding coefficients; and determining, by the compute device, the dictionary based on the updated initial dictionary.

16. The method of claim 15, wherein determining the plurality of training sparse coding coefficients based on the initial dictionary for each of the plurality of training vectors comprises determining, by the compute device, an $L^2$-norm distance from a training residual vector to each of the plurality of basis vectors for each of the plurality of training vectors.

17. The method of claim 15, wherein the plurality of training vectors comprises a plurality of labeled training vectors and a plurality of unlabeled training vectors, wherein acquiring the one or more classifier parameters comprises:

determining, by the compute device, a plurality of labeled training sparse coding coefficients for each of the plurality of labeled training vectors based on the dictionary; and training, by the compute device, a support vector machine based on the plurality of labeled training sparse coding coefficients to generate the one or more classifier parameters, wherein classifying the input vector based on the plurality of sparse coding coefficients comprises classifying, by the compute device, the input vector with use of the support vector machine.

18. One or more non-transitory computer-readable storage media comprising a plurality of instructions stored thereon that, when executed, cause a compute device comprising a hardware pattern-matching accelerator to:

acquire (i) an input vector, (ii) a dictionary comprising a plurality of basis vectors, and (iii) one or more classifier parameters;

determine, with use of the hardware pattern-matching accelerator, a plurality of sparse coding coefficients based on the dictionary and the input vector, wherein (i) the hardware pattern-matching accelerator comprises a plurality of pattern-matching hardware components, each of the plurality of pattern-matching hardware components physically structured to determine an $L^1$-norm from a first vector to a second vector, wherein the plurality of pattern-matching hardware components are operable in parallel such that the hardware pattern-matching accelerator is able to determine an $L^1$-norm from a first vector to each of a plurality of second vectors in parallel, (ii) each of the plurality of sparse coding coefficients is indicative of a magnitude of a corresponding basis vector of the plurality of basis vectors and (iii) the plurality of sparse coding coefficients define an approximation of the input vector, and wherein to determine the plurality of sparse coding coefficients comprises to determine, by the hardware pattern-matching accelerator and in parallel, an $L^1$-norm distance from a residual vector to each of the plurality of basis vectors; and to classify the input vector based on the plurality of sparse coding coefficients and the one or more classifier parameters.

19. The one or more non-transitory computer-readable storage media of claim 18, wherein to determine the plurality of sparse coding coefficients comprises to:

determine an intermediate plurality of sparse coding coefficients, wherein the intermediate plurality of sparse coding coefficients comprises a sparse coding coefficient corresponding to each basis vector of an intermediate subset of the plurality of basis vectors, wherein (i) each of the intermediate plurality of sparse coding coefficients is indicative of a magnitude of the corresponding basis vector and (ii) the intermediate plurality of sparse coding coefficients define an intermediate approximation of the input vector;

determine the residual vector based on the intermediate plurality of sparse coding coefficients, wherein the residual vector indicates a difference between the input vector and the intermediate approximation of the input vector;

select, based on the $L^1$-norm distances from the residual vector to each of the plurality of basis vectors, an additional basis vector of the plurality of basis vectors;

update the intermediate subset of the plurality of basis vectors to include the additional basis vector; and determine an updated intermediate plurality of sparse coding coefficients, wherein the updated intermediate plurality of sparse coding coefficients comprises a sparse coding coefficient corresponding to each basis vector of the updated intermediate subset of the plurality of basis vectors, wherein (i) each of the updated intermediate plurality of sparse coding coefficients is indicative of a magnitude of the corresponding basis vector and (ii) the updated intermediate plurality of sparse coding coefficients define an updated intermediate approximation of the input vector.

20. The one or more non-transitory computer-readable storage media of claim 19, wherein to determine the updated intermediate plurality of sparse coding coefficients comprises to determine an $L^2$-norm distance between the input vector and a test residual vector, wherein the test residual vector comprises a magnitude of each of the updated intermediate subset of the plurality of basis vectors.

21. The one or more non-transitory computer-readable storage media of claim 18, wherein to determine the $L^1$-norm distance from the residual vector to each of the plurality of basis vectors comprises to:

load each of the plurality of basis vectors into a different memory location of an associative memory of the pattern-matching accelerator; and determine an $L^1$-norm distance from each of the plurality of basis vectors to the residual vector by each of the corresponding different memory locations.

22. The one or more non-transitory computer-readable storage media of claim 21, wherein the plurality of basis vectors comprises at least one thousand basis vectors, wherein to load each of the plurality of basis vectors into a different memory location of the associative memory comprises to load each of the at least one thousand basis vectors into a different memory location of the associative memory.

23. The one or more non-transitory computer-readable storage media of claim 18, wherein to acquire the dictionary comprises to:

acquire training data comprising a plurality of training vectors;

determine an initial dictionary;

determine a plurality of training sparse coding coefficients based on the initial dictionary for each of the plurality of training vectors;

update the initial dictionary based on the pluralities of training sparse coding coefficients; and determine the dictionary based on the updated initial dictionary.

24. The one or more non-transitory computer-readable storage media of claim 23, wherein to determine the plurality of training sparse coding coefficients based on the initial dictionary for each of the plurality of training vectors comprises to determine an $L^2$-norm distance from a training residual vector to each of the plurality of basis vectors for each of the plurality of training vectors.

25. The one or more non-transitory computer-readable storage media of claim 23, wherein the plurality of training vectors comprises a plurality of labeled training vectors and a plurality of unlabeled training vectors, wherein to acquire the one or more classifier parameters comprises to:

determine a plurality of labeled training sparse coding coefficients for each of the plurality of labeled training vectors based on the dictionary; and train a support vector machine based on the plurality of labeled training sparse coding coefficients to generate the one or more classifier parameters, wherein to classify the input vector based on the plurality of sparse coding coefficients comprises to classify the input vector with use of the support vector machine.

\* \* \* \* \*